3,048,533
NEUTRONIC REACTOR MANIPULATING DEVICE
Leo A. Ohlinger, Los Angeles, Calif., assignor to the United States of America as represented by the United States Atomic Energy Commission
Filed July 17, 1950, Ser. No. 174,284
5 Claims. (Cl. 204—193.2)

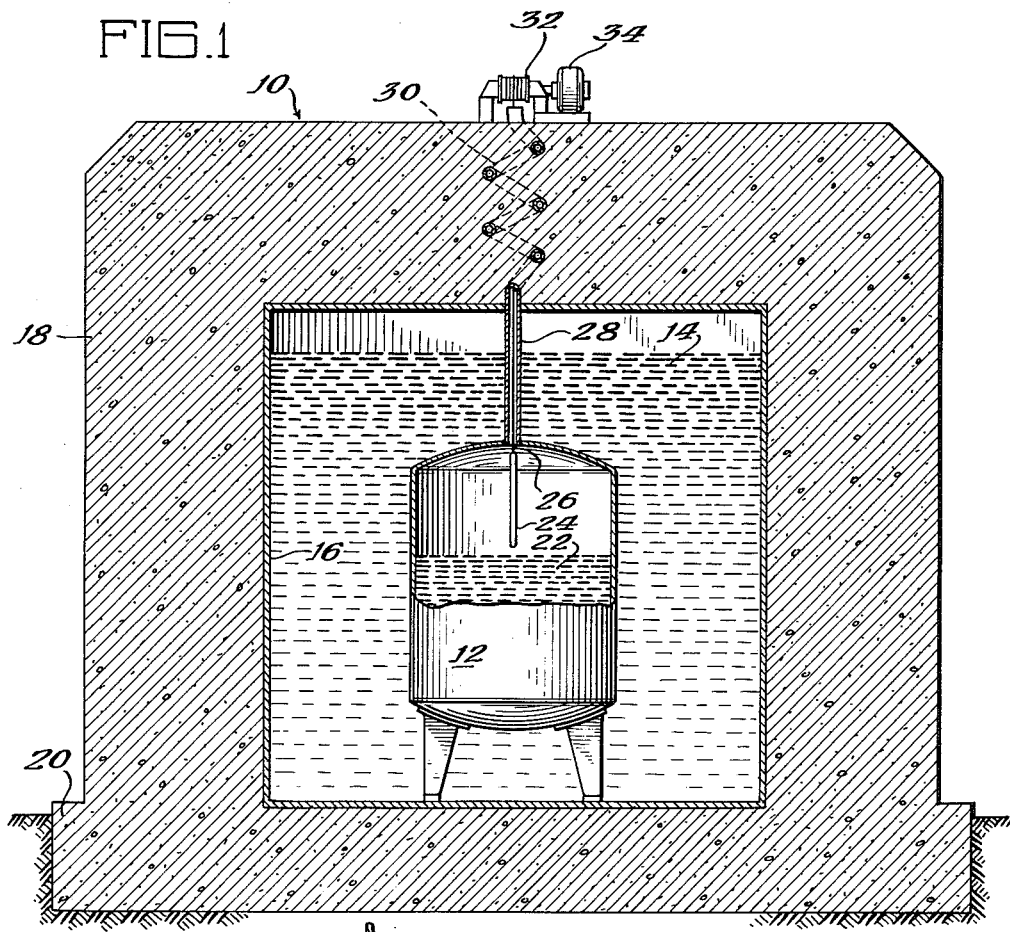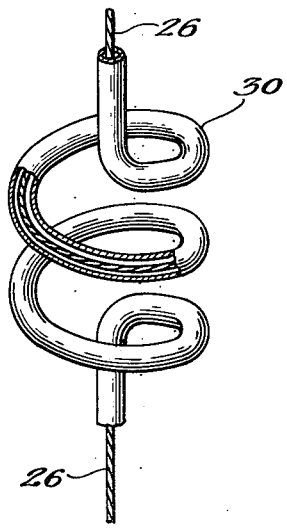

This invention relates to an improvement in neutronic reactor structures. More particularly, the invention relates to a novel device for manipulating, from the exterior of the shield surrounding the active portion of a neutronic reactor, a control rod or other element within the active portion of the reactor.

As is now well known, in order to protect personnel in the vicinity of a neutronic reactor, the active portion of a neutronic reactor must be surrounded with substantial thicknesses of a shielding material, such as concrete, in order to absorb the intense radiations which are given off from the active portion during and after the maintenance of the chain reaction. It is required that devices or mechanisms within the shield, such as absorber control rods, be manipulated from the exterior of the shield.

The present invention provides a very simple, yet safe and reliable, mode of manipulating from the exterior a control rod or analogous member within the heavy shield of the neutronic reactor. In general, the present device constitutes a manipulating cable which extends through a helical conduit in the reactor shield. The helical conduit is free of kinks and corners and thus permits free and unimpeded passage of the manipulating cable. Nevertheless, the helical shape of the conduit prevents any substantial impairment of the shielding efficiency of the shield, since any direct path of radiations from the interior of the shield must traverse virtually the entire thickness of the shielding material.

For better understanding of the invention reference is made to the drawing, in which:

FIGURE 1 is a vertical sectional view of one embodiment of the invention showing only the features of a neutronic reactor that are pertinent to a description of the invention; and FIGURE 2 is a perspective view of a cylindrical helical conduit having a cable therein.

For a more complete description of the particular type of reactor illustrated reference is made to the copending application of Eugene P. Wigner, Leo A. Ohlinger, Gale J. Young, and Alvin M. Weinberg, Serial No. 613,356, filed August 29, 1945. Patent No. 2,708,656, entitled "Neutronic Reactor," issued to E. Fermi et al., also contains a more complete description of reactors suitable for use with the present invention.

In FIGURE 1 a reactor is generally indicated at 10. It consists of a tank 12 entirely surrounded by a coolant medium 14 such as water. Surrounding the water is a lead sheathing 16 that is, in turn, enclosed within a concrete shield 18 supported on a concrete base 20. The entire structure is supported on the earth which serves as an auxiliary shield at the base of the reactor so that the concrete base 20 need not be as thick as the side walls of the shield 18. Within the reaction tank 12 is a slurry or solution 22 that embodies the fissionable materials conducive to a self-sustaining chain reaction. The slurry 22 is the source of neutron radiation and of radioactivity which emanates in all directions from the tank 12. Although the water 14 serves as a cooling medium, it is also a neutron reflector and a neutron shield. That is, neutrons entering the water 14 are in part reflected back into the solution 22, moderated by the water and allowed to pass through to the lead sheathing 16, or are absorbed by the water 14. The lead sheathing 16 absorbs certain radiations, namely gamma rays, both those liberated by the neutron chain reaction developed in the tank 12 and those liberated as the result of the absorption of the neutrons. The concrete shield 18 absorbs most of the neutrons that enter the concrete and also absorbs most of the gamma rays that pass through the lead sheathing 16 and those that result from the absorption of neutrons in the concrete shield 18.

Within the tank 12 is a control rod 24 suspended from a cable 26 over the level of the slurry 22. Extending vertically above the tank 12 is a housing 28 which communicates said tank with a helical conduit 30 traversing the concrete shield 18. The cable 26 extends from the upper end of the control rod 24 through the housing 28 and the conduit 30. Upon leaving the conduit 30 on the outside of the shield 18 the cable 26 winds around a winch 32 actuated by an electric motor 34. The helical conduit 30 is primarily a cylindrical helix as shown in FIGURE 1, which is created by wrapping a segment of tubing or conduit around a cylinder at an angle of inclination, as an ordinary screw thread. The tubing is then placed at the proper location before the concrete is poured around it. The preferred cross-section of the tubing is round. The inner diameter of the helix is greater than that of the cross-section of the conduit to inhibit radiation leakage and to insure free slippage of the cable inside the walls thereof.

At appropriate stages of the reaction of the slurry 22 it is necessary to lower the control rod 24 into said slurry. At other times it is desirable to raise the control rod 24 completely out of the tank 12 and into the housing 28. Whichever movement is required at a given time, it is imperative that the cable 26 be free to move up and down within the conduit 30. As shown in FIGURE 2, the smooth round walls of the helical conduit insure the free slippage of the cable 26 in the conduit 30 without permitting the escape of radiation through any linear path through the shield.

Since certain changes can be made in the foregoing device and different steps may be employed in practicing the same, it is intended that all matter shown in the accompanying drawings and described hereinbefore will be interpreted as illustrative and not in a limiting sense.

What is claimed is:

1. A neutronic reactor comprising a neutron reacting system, a shield surrounding said system to absorb penetrating radiations, at least one conduit passing through said shield from the interior to the exterior, and a cable extending through the conduit, said conduit having a substantially helical path, the helix having an inner diameter greater than that of the conduit.

2. A neutronic reactor comprising a neutron reacting system, a shield surrounding said system to absorb penetrating radiations, at least one conduit through said shield from the exterior to the interior, and a cable extending through the conduit from one end to the other, said conduit being substantially helical and the helix having an inner diameter greater than that of the conduit.

3. In a neutronic reactor shielded to prevent escape of penetrating radiations and having at least one conduit through said shield from the interior to the exterior, the improvement wherein the conduit is substantially helical in form, the helix having an inner diameter greater than that of the conduit.

4. In combination with a neutronic reactor having a source of radioactivity, and a shield surrounding said source, a manipulating device for controlling the reaction of the source from the exterior of the shield comprising a conduit vertically traversing the shield from the exterior to the interior, a cable extending through the conduit, and a control rod within the shield vertically suspended from the cable, the conduit having a helical path thereby permitting free slippage of the cable in the conduit without permitting the escape of the radioactivity through any linear path in the shield a helical path having an inner diameter greater than that of the conduit.

5. The combination with a protective wall, an object positioned below the wall, and a motor above the wall; of a conduit extending through the wall in the shape of a helix having a vertical axis and an inner diameter greater than the inner diameter of the conduit so as to prevent radiation through the conduit from one side of the wall to the other, and a cable extending through the conduit from one side of the wall to the other and being movable therein without binding because of the helical shape of the conduit, the cable interconnecting the motor and the object to enable the motor to raise and lower the object.

References Cited in the file of this patent

UNITED STATES PATENTS

| | | |
|---|---|---|
| 1,160,764 | Robinson et al. | Nov. 16, 1915 |
| 1,270,269 | Davis | June 25, 1918 |
| 1,272,882 | Adams | July 16, 1918 |
| 1,399,111 | Granz | Dec. 6, 1921 |
| 2,324,614 | Dalton | July 20, 1943 |
| 2,630,590 | O'Brien | Mar. 10, 1953 |

FOREIGN PATENTS

| | | |
|---|---|---|
| 114,150 | Australia | May 2, 1940 |
| 233,011 | Switzerland | Oct. 2, 1944 |

OTHER REFERENCES

Surdin: Atomes 4, 47–8 (1949).